Dec. 8, 1964     O. W. MOJONNIER     3,160,024
LINK MEMBER
Filed May 5, 1964
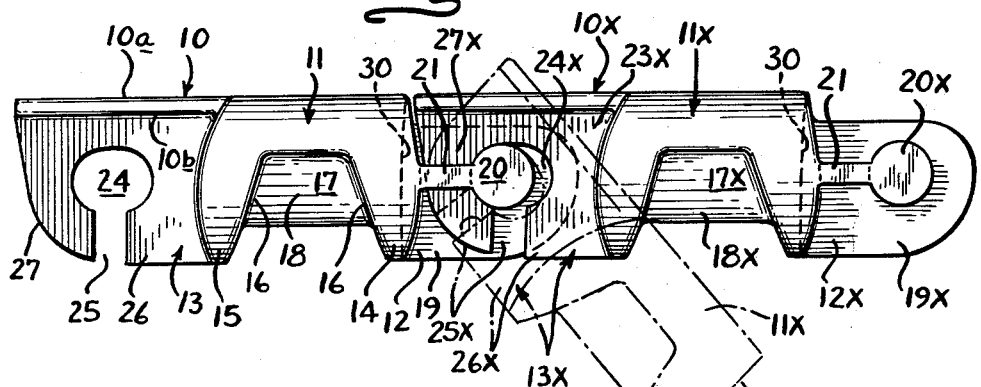
Fig. 1
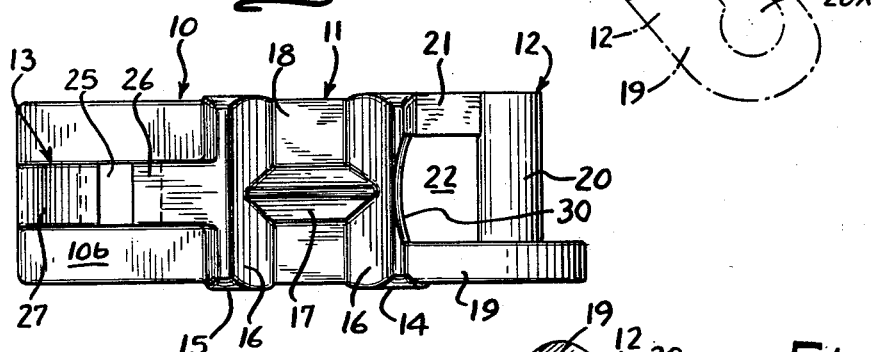
Fig. 2
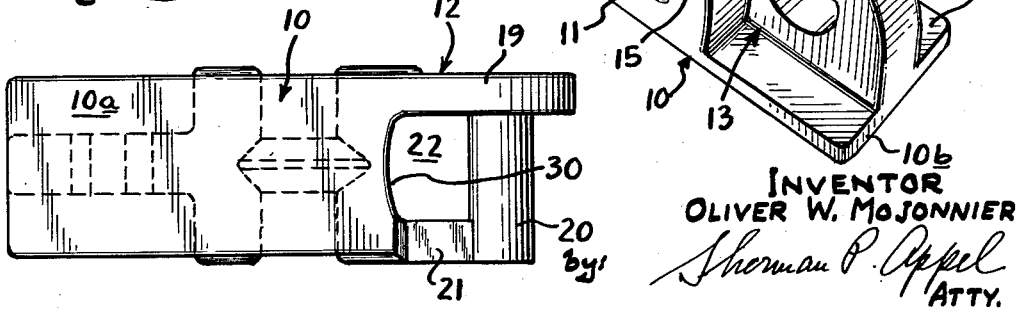
Fig. 3
Fig. 4
INVENTOR
OLIVER W. MOJONNIER
Sherman P. Appel
ATTY.

United States Patent Office 3,160,024
Patented Dec. 8, 1964

3,160,024
LINK MEMBER
Oliver W. Mojonnier, 522 Monroe Ave., River Forest, Ill.
Filed May 5, 1964, Ser. No. 365,039
3 Claims. (Cl. 74—249)

The instant invention relates to links or link members and the like. Particularly, it relates to links or link members which are adapted to be connected to other identical link members to form chains and the like.

A link or link member of the general class in which the instant invention falls comprises, at one end thereof, a male portion having a pin, post or male element and, at the opposite end thereof, a clevis or female portion. Medially disposed between the male and female portion of each link is a lug or tooth engaging portion by reason of which chains comprising the links may be driven or dragged by a sprocket and the like.

In the general category of links to which the instant invention belongs, the male element of each link is adapted to be inserted into the clevis or female portion of an adjacent link whereby a chain is made up. At the time of assembly of links adjacent each other and entry of a male element into the female portion of an adjacent link, the adjacent links of the pair being thus assembled are disposed at an angular relationship which would not obtain during normal or ordinary usage of the made-up link chain. In such angular position, links are adapted to become inter-connected with each other. Subsequent rotation of the adjacent links, or one of them, beyond the angulation allowing inter-connection thereof, results in locking together of the adjacent links and accordingly permits use thereof in a chain without concern about separation.

The links of the chain can be separated however; but such separation can occur only at the time that adjacent links are rotated to an angular relationship substantially the same as that which originally obtained upon assembly of said links.

Briefly stated, the invention resides in a link construction adapted for use in chains and the like and which has a new and novel arrangement of components permitting the link members inexpensively to be cast or forged, and which provides, over conventional links, greatly enlarged load support or weight bearing surfaces. Additionally, the novel construction results in links which have greater longevity than that provided in conventional links of the same class by reason of the fact that wearing or erosion of the links due to normal attrition of the parts thereof, does not deteriorate the locking surfaces to permit unintended dis-engagement of the connected together links during normal or intended usage thereof.

Accordingly, it is an object of the present invention to provide a new and improved chain link member.

It is a further object of the instant invention to provide in such a member a surface adapted for load carrying or weight bearing which covers or extends over as much as up to two-thirds of the normal top of each link, and accordingly up to substantially two-thirds of the normal top of a chain comprising said links, thereby, great efficiency is achieved in distributing or bearing the force of the weight or load being carried by the connected together links.

It is yet another object of the instant invention to provide in said links a unique arrangement of male and female elements, permitting the links to be readily interchanged and rapidly assembled into a chain. By reason thereof, there is a requirement of only minimum manual dexterity in the operation of chain assembly from links embodying the instant invention.

These and other objects, features and advantages of the present invention will become more apparent upon consideration of the following description and appended claims, when considered in conjunction with the accompanying drawing, wherein the same reference character or numeral refers to like or corresponding parts through out the several views.

On the drawings:

FIG. 1 is a side elevational view of the chain comprising a pair of connected together links, each of which embodys a preferred form of the invention, and illustrating in dotted line the manner of assembly.

FIG. 2 is a view looking at the bottom of one of the links shown in FIG. 1.

FIG. 3 is a perspective view thereof.

FIG. 4 is a view looking at the top thereof.

Referring now more particularly to the drawings, the links or link members are of a conventional metal fabrication. They are adapted to be fabricated from stainless steel if desired. The links are adapted to be forged or cast in manners well known to those skilled in the art.

The links each comprise a cover or top generally designated by numeral 10 and defined by upper flat or weight bearing surface 10a and a lower surface 10b. Top or cover 10 is preferably in the shape of an elongated oval from which approximately an end third has been removed, as illustrated in the drawings.

Each link is divided into three general parts as follows: a medial portion, generally identified by the numeral 11; a male portion, generally identified by the numeral 12; and a female portion, generally designated by the numeral 13. The male portion 12 and the female portion 13 are disposed on the opposite sides of the medial portion 11. The portions 11, 12, and 13 may be of substantially equal length. The male portion 12 and the female portion 13 preferably are of equal length for a reason to become apparent hereinafter.

The top 10 extends over substantially all of the female part 13 and all of the medial part 11 from side to side of the link.

The medial portion 11 is defined by a pair of walls 14 and 15. The walls 14 and 15 are spaced apart from each other and at opposite ends of said medial portion 11 respectively define the male portion 12 and the female portion 13. The walls 14 and 15 extend from side to side of the link. Each of the walls 14 and 15 extends downwardly from the top or cover 10 to the bottom of the link, as illustrated in the drawings. Each of the walls 14 and 15 presents an inner sloping flat or surface 16. The surfaces 16 of the respective walls 14 and 15 are flared outwardly from each other as they extend toward the bottom of the link. That is to say, the surfaces 16 of the respective walls 14 and 15 slope inwardly toward each other as they extend the top or cover 10.

A generally centrally disposed or positioned web or divider 17 extends downwardly from the cover 10 medially in the chamber 18 which is formed between the surfaces 16 of the respective walls 14 and 15. The opposite ends of the web or divider 17 are integral or connected with the walls 14 and 15, as illustrated in the drawings. The chamber 18 is the sprocket chamber and it is positioned to register with the teeth of a sprocket wheel (not shown) which will drive the chain comprised of the links herein described. The links herein illustrated are adapted to be driven by a conventional sprocket wheel of a double or paired tooth type. Each pair of teeth will engage in the chamber 18 on opposite sides of the web or divider 17. The sloping of the walls 16 facilitates entry and removal of the sprocket teeth as the link is driven or pulled.

The walls 14 and 15 are of sufficient bulk to permit sloping of the surfaces 16 in the fashion heretofore described. Accordingly, walls 14 and 15 are generally thicker at the upper portions, that is the portions that are connected to the top or cover 10, than they will be at the bottom.

For purpose of orientation and facility of description, "forward," when used herein, shall refer to the relative direction of the male portion 12; and "back" or "rearward," when used in this description, shall refer to the relative direction of the female portion 13.

A side wall 19 extends forward from the lower end portion of wall 14 to the front of the device. Within the framework of the terms of orientation used herein, wall 19 is disposed on the left side. The length of wall 19 is approximately one-third of the link member.

Wall 19 provides a base or support for a pin, post, plug, or male element 20. The longitudinal axis of pin, post, plug, or male member 20 extends from side to side, with the left side of said male element 20 being integral with, connected to or supported by the wall 19, as illustrated in the drawings. Male element 20 is illustrated herein as circular in cross section.

Pin, post, plug, or male element 20 is substantially centrally disposed with respect to the top and bottom of the link. The right side portion of the post 20 is connected to a medial section of the right side portion of the wall 14 by a thin web 21, the opposite ends of which are respectively rigidly secured to, or integral with the post 20 and the forward surface of the wall 14, as illustrated in the drawings.

By reason of the foregoing construction, a tunnel 22 is developed in the male portion 12. The tunnel 22 is defined by post 20, at the front, wall 14 at the rear, web 21 and the wall 19 at the left and right sides, respectively. The passage of tunnel 22 is open and extends from the top to the bottom of the device.

The clevis or female portion 13 extends rearwardly from the rear surface of wall 15. The female element is formed in a web 23. Web 23 is disposed medially the sides of the female portion 13. At its upper end, the web 23 is integral with or suitably connected to the cover or roof 10 along the entire inner portion thereof which is disposed over the female portion 13. The rearward portion of the web 23 is secured to the rear surface of the wall 15.

The web 23 has a hole, opening, or aperture 24 which is generally centrally disposed within the web 23. The opening, hole or aperture 24 extends through the web 23 from side to side, as illustrated in the drawings. The hole, opening, or aperture 24 is preferably eliptical or ovoid in shape. An aisle, throat, or slot 25, which extends from side to side through the web 23 provides, therefore, a downward opening which communicatively connects hole, aperture or opening 24 with the outside.

The minimum diameter of the hole, opening or aperture 24 is slightly larger than the diameter of the post or male element 20. The length of the slot 25 from front to back is substantially the same as the width of the web 21.

The arrangement of the foregoing components of the clevis or female portion 13 provides in the web 23 a pair of arms 26 and 27. The arm 26 is the forward arm and the arm 27 is the rearward arm. Arm 27 defines the rear of the link and, as illustrated in the drawing, extends in a curved path.

For purposes of the instant description, the link member illustrated to the left of FIG. 1 shall be assumed to be the same as the link member which is shown in each of the other figs. Accordingly, similar reference numerals are applied to corresponding parts of the link member to the left of FIG. 1 and on the remainder of the figs. The parts or structural components of the link member to the right of FIG. 1 which corresponds to the parts or structural components of the link member shown in the left of FIG. 1 are further identified by the letter "X."

Now, each link member, together with other identical link members, may be assembled into a link chain in the following manner: A link is placed upon its left side so that its right side is facing upwardly. Aisle, slot or throat 25 is directed toward the assembler with the top or cover 10 facing away from the assembler. In such position, the longitudinal axis of male element or post 20 extends vertically.

A second link is then gripped and disposed at approximately right angles to the first link. The top or cover 10X of the second link is disposed to the right. The entire second link with the throat, slot or aisle 25X in vertical alignment with the web 21, is held above the first or left link. Accordingly, the hole opening or aperture 24X is brought into alignment with the pin, post or male element 20.

In such position, the second link is then merely dropped over the first link until its descent is stopped by engagement with the first link. The downward movement of the second link is stopped by engagement of web 23X with side 19. At that time, arm 27X will then be below the level of the web 21.

Thereupon, the second link is rotated counterclockwise positioning arm 27X in the tunnel 22 and partially therethrough. The second link is rotated counterclockwise with respect to FIG. 1 as far as it can be moved. The limit of rotation will occur as a result of engagement of the rear end portion of the top or cover 10X with the forward end of the top or cover 10. In such position, the adjacent links will be in a substantially straight line.

It is apparent now that the portion of the cover 10X which covers the female portion 13X will now in essence provide a covering for the male portion 12. Accordingly, when adjacent links are assembled and connected in straight alignment, in chain operative position, a cover, almost continuous over the entire chain will be provided. Of course, at times, there will be a small separation of the covers 10 and 10X between adjacent links because of the play permitted by the shape of the opening 24X.

Attention is invited to the fact that the diameter of the post or male element 20 is greater than the distance beween the arms 26X and 27X. It is also observed that arm 27X will be normally disposed in tunnel 22 when assembled adjacent links are in working position; and that therefore, except when adjacent links are disposed at approximately 90 degrees to each other, separation of the links is impossible. The observation is also made that the angular disposition of adjacent links prevailing at assembly or separation is not encountered during normal operating usage of the links.

To insure the proximity of the adjacent covers 10 and 10X, a slight cut-out or concavity is provided in the forward surface of the wall 14 to accommodate the rearward curvature of the arm 27X.

While there has been described herein a link member adapted for use in driven chain conveyors and the like, it is noted that the links herein are also adapted for use as tractor treads, and the like.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. A link member and the like adapted for coupling with like members in end to end uniform alignment and defined by a body having a plurality of integral components, said components comprising a medial portion bounded by a front wall and a rear wall spaced apart from each other and defining therebetween a cavity, said cavity adapted to have removably engaged therein successive sprocket teeth, a side support disposed at a side of said body and extending forward from said front wall, a male element extending laterally from said side support, a web disposed at a side of said body opposite said side support and connecting said male element and front wall, a clevis extending rearwardly from the rear wall and disposed medially of the sides of said body, said clevis having an opening, said opening having an enlarged portion and a restricted portion, wider than said web and smaller than said male element, whereby a clevis of one link member is adapted to be mounted about the male element of an adjacent member and rotated to lock the clevis of said one member between the web and side support of the adjacent member.

2. The link member and the like defined in claim 1 characterized by a top flat extending over substantially all of the medial portion and the clevis, whereby upon joining adjacent members, the cover of the clevis over one link member will substantially cover said side support and male element.

3. In a chain link member and the like adapted to be connected in uniform end to end relation with like members and comprising a one piece body having adjacent sides with integral male and female portions at opposite ends of said body and a medial portion defined by front and rear walls having therebetween a downwardly opening cavity adapted to receive the teeth of a sprocket, said link being characterized by a clevis defining the female portion, said clevis extending rearwardly from said rear wall and disposed medially of the sides of said body, said clevis having a central opening passable from side to side and a restricted downwardly opening throat communicating with said central opening, a post defining the male portion, the longitudinal axis of said post extending transversely of the longitudinal axis of said body, a side wall extending forwardly from only the lower portion of said front wall and connected to one side of said post, a web disposed at the side opposite said side wall and connecting said post to a medial portion of the front wall, the diameter of said post being larger than the throat whereby identical link members can be articulately connected together in an unlockable relation with a portion of the clevis of one link locked between the web and side wall of an adjacent link.

References Cited by the Examiner

UNITED STATES PATENTS

| | | | |
|---|---|---|---|
| 615,285 | 12/98 | Levalley | 74—248 |
| 3,066,549 | 12/62 | Benjamin | 74—249 |
| 3,095,753 | 7/63 | Lengyel | 78—252 |
| 3,123,411 | 3/64 | Ellison | 74—252 |

WILLIAM J. STEPHENSON, *Primary Examiner*.